United States Patent [19]

Kuehbauch

[11] Patent Number: 4,813,098
[45] Date of Patent: Mar. 21, 1989

[54] DEVICE FOR WIPING WINDSHIELDS OF POWER VEHICLES

[75] Inventor: Gerd Kuehbauch, Buehlertal, Fed. Rep. of Germany

[73] Assignee: Robert Bosch GmbH, Stuttgart, Fed. Rep. of Germany

[21] Appl. No.: 169,944

[22] Filed: Mar. 18, 1988

[30] Foreign Application Priority Data

Apr. 30, 1987 [DE] Fed. Rep. of Germany ....... 3714407

[51] Int. Cl.$^4$ .............................................. A47L 1/02
[52] U.S. Cl. ................................ 15/250.21; 15/250.24
[58] Field of Search ........... 15/250.21, 250.23, 250.13, 15/250.24, 250.25

[56] References Cited

U.S. PATENT DOCUMENTS

| | | | |
|---|---|---|---|
| 3,758,911 | 9/1973 | deLavenne et al. | 15/250.23 |
| 3,831,219 | 8/1974 | Deutscner et al. | 15/250.23 X |
| 4,512,056 | 4/1985 | Wattier . | |
| 4,546,518 | 10/1985 | Harbison et al. | 15/250.23 |
| 4,570,283 | 2/1986 | Osterday | 15/250.21 |
| 4,621,389 | 11/1986 | Grare | 15/250.23 |
| 4,630,327 | 12/1986 | Schmidt et al. | 15/250.23 |
| 4,649,590 | 3/1987 | Merkel et al. | 15/250.21 |
| 4,716,612 | 1/1988 | D'Alba | 15/250.23 |
| 4,732,048 | 3/1988 | Sakakibara et al. | 15/250.23 |

FOREIGN PATENT DOCUMENTS

| | | | |
|---|---|---|---|
| 1530629 | 10/1969 | Fed. Rep. of Germany ... | 15/250.23 |
| 3405677 | 8/1984 | Fed. Rep. of Germany . | |
| 701090 | 2/1966 | Italy | 15/250.23 |

Primary Examiner—Harvey C. Hornsby
Assistant Examiner—Frankie L. Stinson
Attorney, Agent, or Firm—Michael J. Striker

[57] ABSTRACT

A device for wiping windshields to power vehicles comprises a wiping member, a wiping arm which performs an oscillating movement about an oscillation axis and has a free end spaced from the latter, a lever mechanism articulatedly connected with the free end of the wiping arm, and swivelably connected with the wiping member, the lever mechanism having a swivel axis which is a part of a swivel connection between the mechanism and the wiping member, the lever mechanism performing a swinging movement which branches from and is determined by the oscillating movement so as to constantly change a distance from the swivel axis to the oscillation axis, the lever mechanism including a gear transmission which changes the swinging movement branched from the oscillating movement.

19 Claims, 3 Drawing Sheets

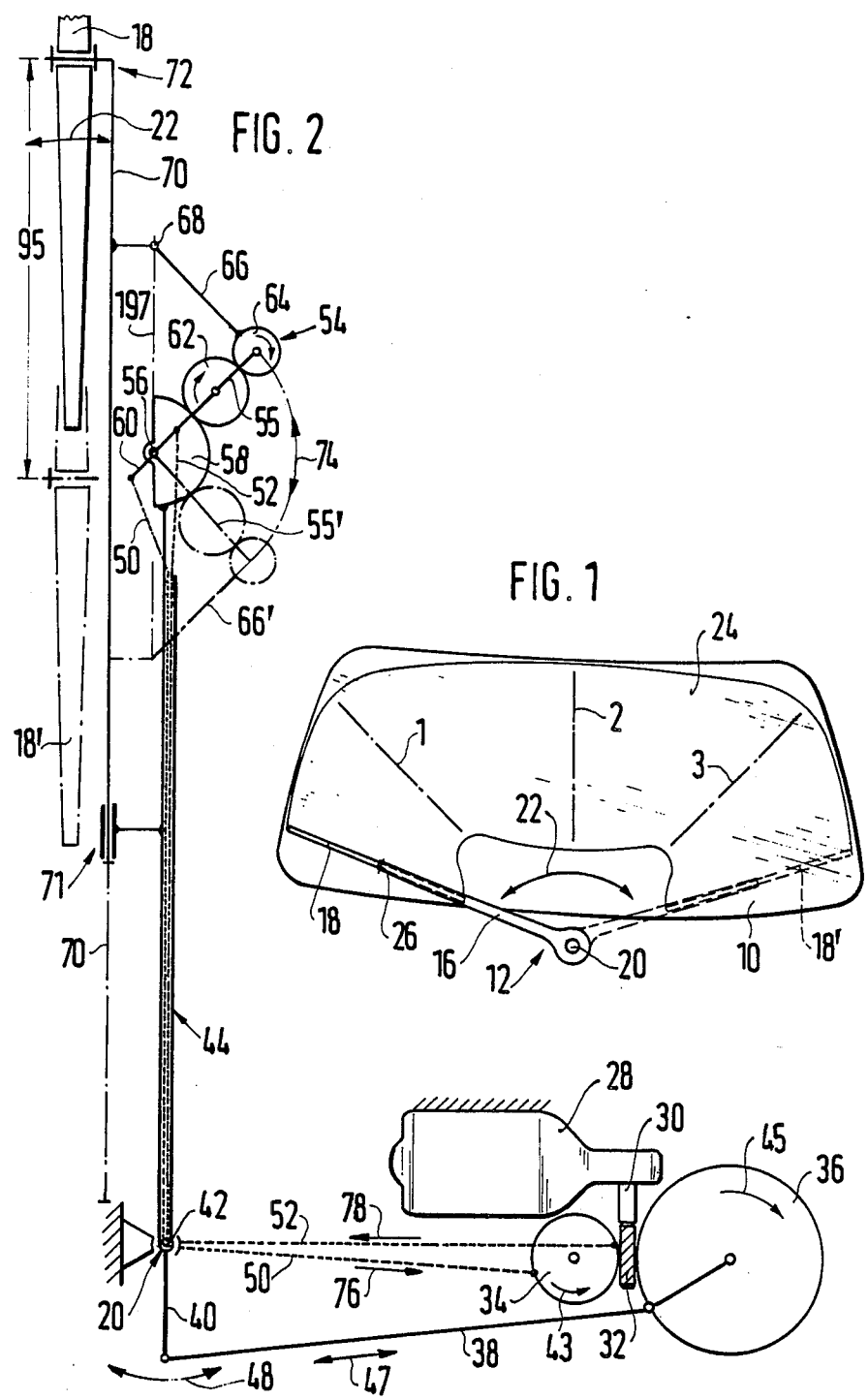

DEVICE FOR WIPING WINDSHIELDS OF POWER VEHICLES

BACKGROUND OF THE INVENTION

The present invention relates to a device for wiping windshields of vehicles. More particularly, it relates to such device for wiping which has an oscillatingly driven wiping arm, a lever mechanism articulatedly connected with its free end opposite to an oscillating axis and having a swivel axis which belongs to a swivel connection between the mechanism and a wiping member lying on the windshield, wherein the lever mechanism performs a swinging movement which is produced by the oscillating movement and determined by the latter and constantly changes the distance of the swivel axis from the oscillating axis.

Wiping devices of the above mentioned general type are known in the art. One of such devices is disclosed, for example in the German document DE-OS No. 34 05 677. In this device the lever mechanism is driven in the swinging movement by means of a linkage, and naturally the value of the swinging movement is directly dependent on the value of the lever arm which belongs to the linkage. Great swinging movements can be achieved only in structures through which a required space is not available in all situations. A further disadvantage of the known wiping device is the fixed arrangement of the lever mechanism of the wiper, so that the wiping arm also performs a jumping movement when it oscillates over the windshield.

SUMMARY OF THE INVENTION

Accordingly, it is an object of the present invention to provide a wiping device of the above mentioned general type, which avoids the disadvantages of the prior art.

In keeping with these objects and with others which will become apparent hereinafter, one feature of the present invention resides, briefly stated, in that the lever mechanism has a gear transmission which changes the movement branching from the oscillating movement, for example increasing the same.

When the wiping device is designed in accordance with these features, the drive movement which is produced from the swinging movement is achieved by respectively compact structure of the means required for it, so that the mounting space consumption can be very small. By a respective ratio in the gear transmission, the drive movement can be respectively increased when desired.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a plan view of a windshield of a power vehicle with a wiping device shown in principle;

FIG. 2 is a view schematically showing the inventive wiping device in accordance with a first embodiment of the invention;

DESCRIPTION OF THE PREFERRED EMBODIMENTS

Figure 3:
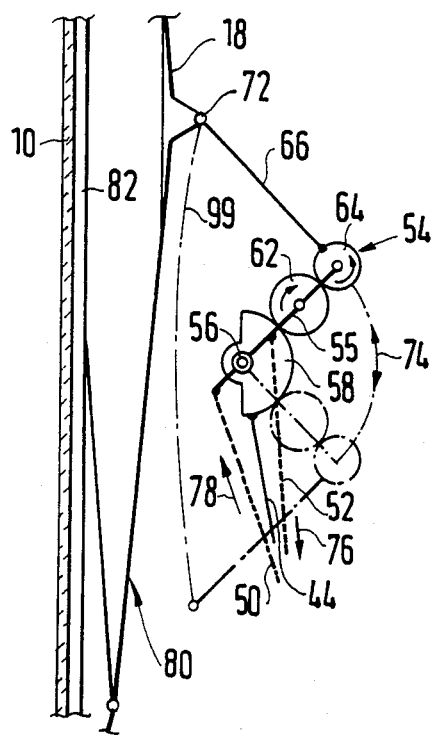
FIG. 3 is a view showing the inventive wiping device in accordance with a second embodiment of the invention.

A windshield 10 is shown in FIG. 1, and a wiping device 12 is associated with the windshield. The wiping device has a not shown drive with an oscillating transmission which oscillatingly drives a wiping lever 16. The wiping lever 16 together with a wiping member 18 articulatedly connected with its free end through a swivel or hinge 26 therefore oscillates about an oscillation axis 20 in direction identified with the double arrow 22 between two return positions. One of the return positions is shown in FIG. 1 by a solid line, while the other return position is shown in a broken line and identified with reference numeral 18'.

During the oscillating movement the wiping member 18 which lies on the windshield 10 to be wiped performs a displacing movement which extends radially to the oscillation axis 20, so that the wiping field 24 covered by the wiping member 18 has a shape which deviates for a circular segment. The distance from the oscillation axis 20 to the hinge 26 also constantly changes when the wiping device is in operation. The wiping devices operating in this manner are utilized when a single windshield wiper must be used for covering a great wiping field on the windshield 10 to be wiped. Especially important is to cover windshield corner regions which are remote from the oscillation axis 20. Independently of this reason, it is, however, also recommended to use such wiping devices also when several particularly two wiping devices arranged near one another are associated with one power vehicle windshield. The transmission of these two wiping devices is designed so that each wiping member which belongs to the respective wiping device covers an optimal wiping field extending close to the windshield edge.

As can be seen from FIG. 2, the inventive wiping arrangement has a drive aggregate 28 which includes an electric motor and a reduction transmission. A drive shaft 30 of the drive aggregate 28 has a transmission worm shaft 32 which engages with a first worm gear 34 and a second worm gear 36. Both worm gears 34 and 36 are arranged at opposite sides of the worm shaft 32. The worm gear 36 forms a rotatable crank, and an end of a driving rod 38 is pivotably connected with it. The other end of the driving rod 38 is pivotably connected with a rocking arm 40 which is mounted on a wiper shaft 42. The latter is supported fixedly on the frame. The wiper arm 42 forms an oscillation axle for the wiping lever 16 which has a wiping arm 44 fixedly connected with the wiper shaft 42, and the wiping member 18 articulatedly connected with it. With rotating drive shaft 30, the worm wheel 36 rotates in direction of the arrow 45, so that the driving rod 38 performs a reciprocating movement identified with the double arrow 47. With this movement of the driving rod 38, the rocking arm 40 performs an oscillating movement 48, which is shared by the wiper shaft 42 and transmitted from it to the wiping lever 16. This oscillating movement is shown in FIGS. 1 and 2 with the double arrow 22.

Ropes 50 and 52 are connected with their one end to the worm gear 34 in a twist-free manner. Both ropes 50 and 52 extend through the wiper shaft 42 which is formed as a hollow shaft and articulatedly connected by a not shown deviating element, for example, guiding rollers or the like in the tubular wiping arm 44. Near the free end of the tubular wiping arm, it has an outlet opening for the other end of both ropes 50 and 52 which are mounted on a transmission arm 55 which belongs to the lever mechanism 54. The transmission arm 55 is supported via a swinging axis 56 on a toothed segment 58 which is fixedly connected with the wiping arm 44. The swinging axis 56 is located in the center of the teeth of the toothed segment 58.

The transmission arm 55 extends with its end 60 outwardly beyond the swinging axis 56. The rope 50 is mounted on the end 60 of the transmission arm 55, while the end of the rope 52 is mounted relative to the swinging axis 56 on the side of the transmission arm 55 which is opposite to the end 60. The distances between both mounting points of the ropes 50 and 52 on the transmission arm 55, 60 are identical with respect to the swinging axis 56. Also, both mounting points of the other ends of the ropes 50 and 52 are identical with respect to the axis of rotation of the gear 34. An intermediate gear 62 is supported on the transmission arm 55 and engages with the teeth of the toothed segment 58. An outer pinion 64 is rotatably arranged on the free end of the transmission arm 55 and engages with the teeth of the intermediate wheel 62. A swinging lever 66 is fixedly connected with the outer pinion 64 and has a swivel axis 68 for a guiding rod 70 which has a swivel or hinge connection 72. Through this connection, the wiping member 18 is connected with the wiping arm 44.

In the embodiment of FIG. 2 the guiding arm 70 which is connected with the wiping arm 44 by the hinge 68 forms a part of the wiping arm 44 which in each case of the described embodiments has the hinge connection 72 to the wiping member 18. It should be mentioned with respect to FIG. 2 that the hinge axis 68 between the swinging levers 66 and the structural elements connected with it, as well as the swinging axis 56 of the transmission arm 55 are arranged stationarily on the windshield to be wiped. The pivot axis 68 is displaceably supported in a bushing guide 71 which is fixedly connected with the wiping arm, so as to ensure that the guiding rod 70 maintains a definite operational position and does not swing about the pivot axis 68.

The operation of the wiping device of FIG. 2 is described hereinbelow. When the drive aggregate 28 is activated and the drive shaft 30 rotates, both worm gears 34 and 36 move in opposite directions in accordance with the arrows 43 and 45. The above described oscillating movement is produced through the worm gear 36. A predetermined swinging movement is produced on the driven shaft 30 from the oscillating movement and must be supplied to the lever mechanism 54. It is clear that through the rotating worm gear 34, the ends of the ropes are moved in correspondence with their distance from the axis of rotation of the worm gear 43. Since the other end of the rope 54 is fixedly connected with the transmission arm 60, it oscillates about the swinging axis 56. In the embodiment of FIG. 2 it is pulled through the rope 50 to an operational position 55′ which is shown in a broken line, while the end 60 reaches its other return position. During further rotation of the worm gear 34, the other rope 52 takes over a pulling function. More particularly, the end 60 of the transmission arm 55, 60 is again pulled to the operational position shown in a solid line in FIG. 2. The lever mechanism 54 oscillates between its both return positions in accordance with the double arrow 74. Both ropes 50 and 52 are pulled by the worm wheels 34 which operates as a pulling lever, alternatingly in direction of the arrow 76 and return the other rope in direction of the arrow 78. The oscillating transmission 36, 38, 40, 42, 44, the rope transmission 34, 50, 52, 55, 56 and the ratio of the gear transmission 58, 62, 64, 66 are designed and selected relative to one another so that the hinge axis 68 with the oscillating intermediate positions 1, 2, 3 identified in dash-dot lines in FIG. 1 assume the swinging intermediate position 68, 68′, 68 in FIG. 7. In the oscillating return positions 18 and 18′, can for example the oscillating intermediate position 268 be advantageous.

The embodiment of FIG. 3 is in principle identical to the above described embodiment. The parts which are similar to the parts in FIG. 2 are identified with the same reference numerals as in FIG. 2. In deviation from the arrangement in FIG. 2, the hinge axis 72 between the swinging lever 68 and the wiping member 18, and the swinging axis 56 of the lever mechanism 54 lie in planes which are approximately parallel to the windshield 10. The windshield 10 to be wiped and a supporting frame which belongs to the wiping member 18 and provided for a wiping element 82 lying on the windshield are seen in FIG. 3. In the embodiment of FIG. 3 the guiding rod can be dispensed with, since with the above described arrangement of the hinge axis 72 the wiping member 46 is held in a predetermined operational position. In the construction of FIG. 2, however, further guiding means are required between the wiping member and the wiping arm 44 because of the arrangement of the hinge axis 68 which stands on the windshield. These additional guiding means are formed by the guiding rod and a guiding bush 71 which is associated with the guiding rod and fixedly connected with the wiping arm 44. It is however recommended that these guiding means are formed by a lever mechanism which corresponds to the above described lever mechanism 54 and is also arranged on the wiping arm.

Figure 4:
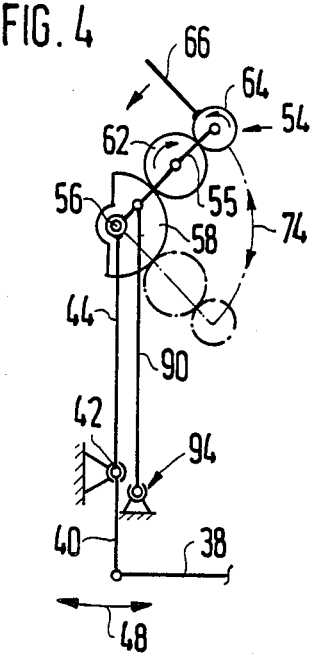
FIG. 4 shows the inventive wiping device in accordance with still a further embodiment of the invention.

In the embodiment of FIG. 4 the lever mechanism corresponds to the lever mechanism 54 of the above described embodiment so that the reference numerals used for the lever mechanism will be used for the embodiment in FIG. 4 as well. In deviation from the constructions shown in FIGS. 2 and 3, in the arrangement of FIG. 4 the swinging movement (double arrow 74) for the lever mechanism 54 is not provided by a rope pulling transmission, but instead performed by a control rod 90. The control rod is fixedly connected with its one end to the frame in an oscillating member, while its other end 92 is pivotally connected with the transmission arm 55. When the wiping arm 44 is driven in the above described manner in oscillating movement, the lever mechanism 54 obtains forcedly the swinging movement in accordance with the double arrow 74. In deviation from the above described embodiment of FIG. 4, it is recommended that the bearing points 94 are arranged not fixedly on the frame, but instead in a movable manner, so that in certain cases advantageous movement course for the lever mechanism 54 is achieved. A control of the bearing points 94 is recommended via for example a lever mechanism such as in the wiping arrangement of the German document DE-OS 34 05 677.

It is clear that by the above described swinging movement 74 of the lever mechanism 54, a longitudinal displacement of the wiping member 18 on the windshield 10 is produced which is determined on the one hand by the value of the swinging movement in accordance with the arrow 74 and on the other hand by the transmission ratio between the teeth of the toothed segment 58 and the teeth of the outer pinion 64. In many cases it is advantageous when the partial circle of the wiping arm-fixed teeth which in this embodiment is formed by the toothed segment 58 is greater than the partial circle of the outer pinion 64. With the rotating outer pinion 64 the swinging lever 66 which is fixedly connected with it also turns, and the wiping member 18 which lies on the windshield and is articulatedly connected with the swinging lever displaces on the windshield. In the embodiment of FIG. 2 the maximum displacement stroke of the wiping member 18 is identified with the value 95. Further, the wiping member 18 is shown in dash-dot lines in its other operational position. This is also true for the guiding rod 70 which is connected with the wiping member 18 or with the swinging lever 66. When the effective length of the swinging lever 66 corresponds to the value which is provided by the distance between the swinging axis 56 and the axis of rotation of the outer pinion 64, the hinge axis 68 between the swinging lever 66 and the wiping member 8 moves along a straight line which is identified in FIG. 2 with the reference numeral 97. In the embodiment of FIG. 3 the effective length of the swinging lever 66 is somewhat greater than the distance between the swinging axis 56 and the axis of rotation of the pinion 64. In a shown construction the hinge axis 72 moves over a slightly curved path 99 which is shown in a dash-dot line.

Figure 7:
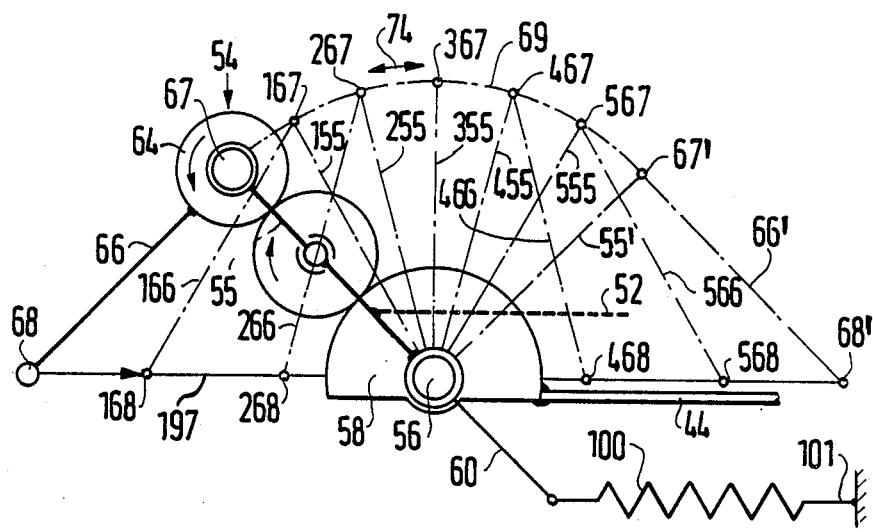
FIG. 7 is a schematic side view showing the transmission head of FIG. 5 with several intermediate positions of the transmission.

FIG. 7 shows different operational intermediate positions of the lever mechanism 54. The operational positions shown in solid lines correspond to the operational positions shown in FIGS. 2 and 3. It can be clearly seen from FIG. 7 that the axis of rotation 67 of the outer pinion 64 moves along a path 69 when the transmission arm 55 swings about the swinging axis 56 which forms also the axis of curvature for the teeth of the toothed segment 58. The intermediate positions of the swinging lever 55 between its one return position shown in solid line in FIG. 7 and another return position 55" are identified with 155, 255, 355 (central position), 455 and 555. The swinging lever 66 as well as the hinge axis 68 are provided with respectively changed reference numerals. In the central position the transmission arm 55 and the swinging arm 66 coincide with one another.

Since in the embodiment of FIG. 2 the ratio of the effective length of the swinging arm 66 and the distance between the swinging axis 56 and the axis of rotation 67 of the outer pinion 64 is identical, the hinge axis 68 moves over a straight line which is identified with reference numeral 197. Independently of the fact that in FIG. 7 the swinging angle of the transmission arm 55 which forms a transmission head 58, 62, 64 or the lever mechanism 54 is only 90°, it is evident that it can be increased to 180° without difficulties so that the transmission arm and the swinging arm are located relative to one another in a so called stretched position. This means that the maximum radial displacement of the wiping member on the windshield 10 to be wiped can be calculated as the sum of the following values:

The effective length of the swinging lever×2 and the distance between the swinging axis 56 and the axis of rotation 67 of the outer pinion 64×2.

It can be further seen from FIG. 7 that the swinging movement of the transmission arm 55 in accordance with the arrow 74 or the lever mechanism 54 can also be implemented with only one rope 52, when the return movement is performed by a spring means which is pretensioned by the rope 52 in the movement acting in one swinging direction and thereby during relaxation of the rope 52 enforces the return swinging movement. This is performed in FIG. 7 by a pulling spring 100 which is supported at one side fixed on the frame and whose one end 101 is supported fixedly on the wiper. The other free end of the pulling spring 100 cooperates for example with the end 60 of the transmission arm 55 which through the end 60 performs tensioning of the spring 100. In such a case instead of the above specified arrangement, advantageously a pretensioned spiral spring is selected which surrounds the swinging axis 56. One end of the spiral spring is held fixedly on the wiping arm, while the other end engages the transmission arm 55.

Figure 5:
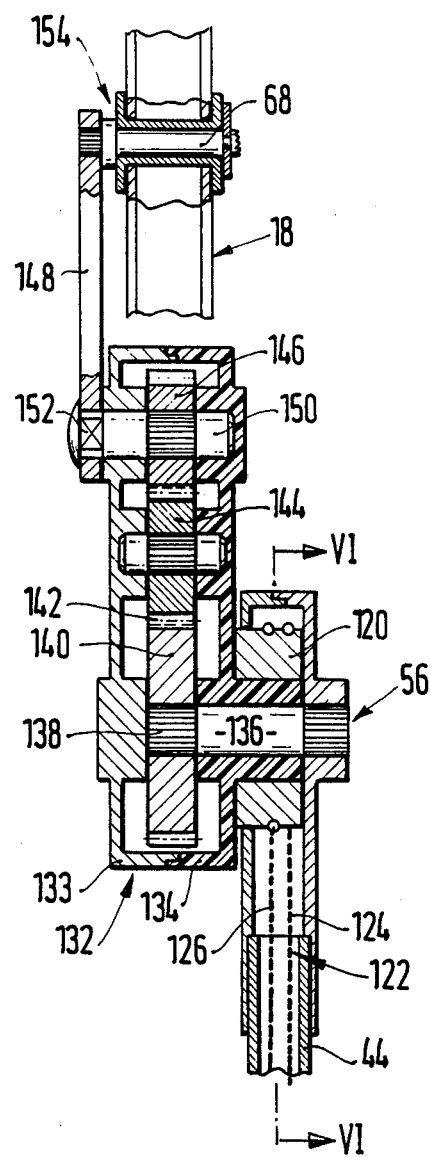
FIG. 5 is a view showing a transmission head of the wiping arrangement of the invention in section.
Figure 6:
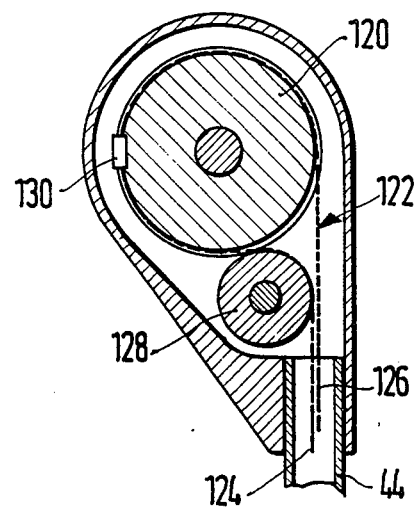
FIG. 6 is a partial view of the transmission head of FIG. 5, in a section taken along the line VI—VI.

FIGS. 5 and 6 provide a detailed showing of the inventive wiping arrangement. It can be seen from both Figures that the wiping arm 44 is tubular, and both ropes 50 and 52 extend through the wiping arm pipe 44. In this embodiment it is advantageous, in deviation from FIGS. 2-4 and FIG. 7, to provide a single rope 112 which in its central region extends over a rope roller 120 and in some cases is wound over it many times. The rope 122 has two rope runs 124 and 126 which correspond to both ropes 50 and 52 in accordance with the embodiment of FIG. 2 and whose ends are connected with the worm wheel 34 in a twist-free manner. It is clear that for unobjectionable guidance of the rope runs, deviating rollers 128 or other guiding means can be provided.

Furthermore, in the embodiment of FIGS. 5 and 6 the rope is mounted in its central region identified with reference numeral 130 on the rope roller 120. The rope roller 120 is fixedly connected with a half 133 of a housing-shaped transmission box 132 which corresponds to the transmission arm 55. Both housing parts 133 and 134 of the transmission box 132 are arranged in an oscillating manner on an axis 136 which is fixedly connected with the wiping arm. The wiping arm-fixed axis 136 extends with its one end 138 in the transmission box 132. A central toothed gear 140 is mounted on the end 136 of the axis and has teeth 142 which form curved teeth of the toothed segment 58. Further, an intermediate pinion 144 is rotatably supported on both halves 133 and 134 of the transmission box 132. The support of the outer pinion 146 is provided by both housing halves 133, 134 of the transmission box 132. For outer pinion-fixed connection of the swinging lever 148, the outer pinion 146 is mounted on a rotary pin 150 which extends with its one end 152 outwardly beyond the transmission box 132. The end of the swinging lever 148 is held in a rotary-fixed manner on the end 152. The free end of the swinging lever 148 is provided with the swivel connection 154 with the swivel or swing axis 68 for the wiping member 18.

For selective clamping or unclamping of the rope runs 124 and 126, the rope roller 120 which forms a structural part fixedly connected with the transmission box 132, is turned about the axis of the bearing pin 136 so that the transmission box 132 is taken over. Therefore, the intermediate wheel 144 rolls relative to the teeth 142 of the central toothed wheel 140 and transmits its rotary movement to the outer pinion 146, so that the swinging lever 148 together with the shaft 150 swings about its axis. The intermediate wheel 144 serves for reversing the rotary direction of the outer pinion 146. The ratio between the central toothed wheel 140 and the outer pinion 146 is determined by the ratio of the partial circle of the central toothed wheel 140 to the diameter of the outer pinion partial circle.

From given possible transmission ratios, it is possible in connection with the selected transmission ratio between the oscillating transmission and the rope pulling transmission produced from the number of teeth of both worm wheels 34 and 36, to provide an optimal determination between the oscillating movement (double arrow 22) and swinging movement (double arrow 74). The inventive wiping device has the following advantages as compared with known stroke wiping devices, for example such as disclosed in the German Pat. No. 2,215,307:

It provides an extremely favorable ratio between the required volume and the achieved stroke. The masses which are accelerated during the stroke movements are reduced to absolutely insignificant. The inventive wiping device can be used both for large wiping devices with long wiping members and great strokes, and also for performing complicated curved paths with high accelerations. The progress of the stroke movement is absolutely harmonous. No arresting or coupling slippage are produced when the oscillating path of the inner end of the wiping member which faces toward the oscillating axle is followed. Further, the inventive wiping device has a high operational safety and a good efficiency since only rotary movements are required for producing the stroke movement. Further, a problemless sealing of the stroke transmission relative to surrounding is possible, and an absolutely safe running in a negative weather conditions is insured. Also, easy adjustment of the swinging movement of the lever mechanism to respective requirements is possible. Finally, the inventive wiping device satisfies the high requirements as to the reduction of the operational noise. Because of the wiper shaft-fixed arrangement of the wiping arm, the nozzles for ejecting of wiping water can be mounted on the windshield to be wiped on the wiping arm.

It will be understood that each of the elements described above, or two or more together, may also find a useful application in other types of constructions differing from the types described above.

While the invention has been illustrated and described as embodied in a wiping device for windshields of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for wiping windshields of power vehicles, comprising a wiping member; a wiping arm which performs an oscillating movement about an oscillation axis and has a free end spaced from the latter; a lever mechanism articulatedly connected with said free end of said wiping arm, and swivelably connected with said wiping member, said lever mechanism having a swivel axis which is a part of a swivel connection between said mechanism and said wiping member, said lever mechanism performing a swinging movement which branches from and is determined by said oscillating movement so as to constantly change a distance from said swivel axis to said oscillation axis, said lever mechanism including a gear transmission which changes said swinging movement branched from said oscillating movement.

2. A device for wiping as defined in claim 1, wherein said gear transmission of said lever mechanism increases said swinging movement which branches from said oscillating movement.

3. A device for wiping as defined in claim 1; and further comprising a drive aggregate having an output shaft for branching said swinging movement from said oscillating movement.

4. A device for wiping as defined in claim 3; and further comprising a rope pull transmission provided between said output shaft of said drive aggregate and said lever mechanism.

5. A device for wiping as defined in claim 4, wherein said lever mechanism has a part which is articulatedly connected with said wiping arm, said rope pull transmission having a gear which cooperates with said output shaft and has an axis of rotation, said rope pull transmission also having a rope with one end which is mounted in a twist-free manner on said gear at a distance from said axis of rotation, and another end which is mounted on said part of said lever mechanism with a distance from said swinging axis; and further comprising means for loading against the pulling direction of said rope.

6. A device for wiping as defined in claim 5, wherein said means for loading includes a return spring.

7. A device for wiping as defined in claim 5, wherein said means for loading includes a second rope with one end which is connected in a twist-free manner with said gear opposite to said one end of said first-mentioned rope as considered with respect to said axis of rotation and at a distance from said axis of rotation, and another end which is fixed with said part of said lever mechanism.

8. A device for wiping as defined in claim 7, wherein said gear transmission is formed as a toothed gear transmission.

9. A device for wiping as defined in claim 8, wherein said lever mechanism has an intermediate gear, said transmission having a transmission housing and a curved toothing which is fixedly connected with said wiping arm and has an axis of curvature, said curved toothing engages with said intermediate gear of said lever mechanism, said gear transmission also including an outer pinion which engages with said intermediate gear, said intermediate gear and said outer pinion being supported in said transmission housing, and said transmission housing being oscillatable about said axis of curvature of said toothing.

10. A device for wiping as defined in claim 9, wherein said part of said lever mechanism is formed as a rope roller which is fixedly connected with said transmission housing and over which both said ropes are wound.

11. A device for wiping as defined in claim 10, wherein said rope roller has a peripheral region, said both ropes being formed as runs of a single rope which has a central portion connected with said peripheral region of said rope roller.

12. A device for wiping as defined in claim 9, wherein said lever mechanism has a swinging lever connected with said outer pinion, said swinging lever having a free end provided with the swivel connection.

13. A device for wiping as defined in claim 9, wherein said outer pinion has a toothing which extends over a partial circle, said toothing which is connected with said wiping arm extending over a partial circle which is greater than said partial circle of said outer pinion.

14. A device for wiping as defined in claim 5, wherein said swinging axis is formed as a wiper shaft, said wiper shaft and said wiping arm being tubular, said rope extending through said wiping arm and also through said wiping shaft.

15. A device for wiping as defined in claim 5; and further comprising means for determined a course of said rope and including guiding rotors.

16. A device for wiping as defined in claim 5; and further comprising means for determining a course of said rope and including deviating rollers.

17. A device for wiping as defined in claim 1, wherein said swivel axis extends perpendicularly to said wiping member, while said oscillation axis of said lever mechanism is arranged so that it extends perpendicularly to the windshield.

18. A device for wiping as defined in claim 1, wherein said swivel axis of said wiping member and said oscillation axis of said lever mechanism extend in planes which are at least approximately parallel to the windshield.

19. A device for wiping as defined in claim 1; and further comprising a control rod which positively causes the swinging movement of said lever mechanism, said control rod having one end which is supported in a swiveling manner and another end which is articulatedly connected with said swivel mechanism.

* * * * *